(12) United States Patent
Ferguson et al.

(10) Patent No.: US 9,081,385 B1
(45) Date of Patent: Jul. 14, 2015

(54) LANE BOUNDARY DETECTION USING IMAGES

(71) Applicant: Google Inc., Mountain View, CA (US)

(72) Inventors: David Ian Ferguson, San Francisco, CA (US); Turgay Senlet, Piscataway, NJ (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 13/723,358

(22) Filed: Dec. 21, 2012

(51) Int. Cl.
*G01C 22/00* (2006.01)
*G05D 1/02* (2006.01)

(52) U.S. Cl.
CPC .................................... *G05D 1/0246* (2013.01)

(58) Field of Classification Search
CPC .................... G06K 9/00798; G05D 1/0246
USPC .......................................................... 701/28
See application file for complete search history.

(56) References Cited

U.S. PATENT DOCUMENTS

| | | | |
|---|---|---|---|
| 4,970,653 A | 11/1990 | Kenue | |
| 5,245,422 A | 9/1993 | Borcherts et al. | |
| 5,307,419 A | 4/1994 | Tsujino et al. | |
| 5,410,346 A | 4/1995 | Saneyoshi et al. | |
| 5,572,428 A | 11/1996 | Ishida et al. | |
| 5,790,403 A | 8/1998 | Nakayama | |
| 6,327,536 B1 | 12/2001 | Tsuji et al. | |
| 6,546,118 B1 | 4/2003 | Iisaka et al. | |
| 6,820,006 B2 | 11/2004 | Patera | |
| 6,859,731 B2 | 2/2005 | Takafuji et al. | |
| 6,930,593 B2 | 8/2005 | Crawshaw | |
| 7,167,799 B1 | 1/2007 | Dolgov et al. | |
| 7,184,073 B2 | 2/2007 | Varadarajan et al. | |
| 7,363,151 B2 | 4/2008 | Nomura et al. | |
| 8,184,859 B2 | 5/2012 | Tanji | |
| 8,269,652 B2 | 9/2012 | Seder et al. | |
| 8,284,995 B2 | 10/2012 | Diaz et al. | |
| 8,473,144 B1 | 6/2013 | Dolgov et al. | |
| 2002/0183929 A1 | 12/2002 | Tsuji et al. | |
| 2003/0060969 A1 | 3/2003 | Waite et al. | |
| 2006/0206243 A1 | 9/2006 | Pawlicki et al. | |
| 2006/0220912 A1 | 10/2006 | Heenan et al. | |
| 2007/0069874 A1 | 3/2007 | Huang et al. | |
| 2007/0203617 A1 | 8/2007 | Haug | |

(Continued)

OTHER PUBLICATIONS

Wei Li et al., "Recognizing white line markings for vision-guided vehicle navigation by fuzzy reasoning," Pattern Recognition Letters vol. 18, Issue 8, pp. 771-780, Aug. 1997.

(Continued)

*Primary Examiner* — James Trammell
*Assistant Examiner* — Michael D Lang
(74) *Attorney, Agent, or Firm* — McDonnell Boehnen Hulbert & Berghoff LLP

(57) ABSTRACT

Methods and systems for lane boundary detection using images are described. A computing device may be configured to receive, from an image-capture device coupled to a vehicle, an image of a road of travel of the vehicle. The computing device may be configured to identify a pixel in the image based on an intensity of the pixel and a comparison of the intensity of the pixel to respective intensities of neighboring pixels. Based on the intensity of the pixel and the comparison, the computing device may be configured to determine a likelihood that the pixel belongs to a portion of the image depicting a lane marker on the road. Based at least on the likelihood, the computing device may be configured to and provide instructions to control the vehicle.

14 Claims, 8 Drawing Sheets

(56) References Cited

U.S. PATENT DOCUMENTS

| | | |
|---|---|---|
| 2007/0210953 A1 | 9/2007 | Abraham et al. |
| 2008/0162027 A1 | 7/2008 | Murphy et al. |
| 2008/0262721 A1 | 10/2008 | Guo et al. |
| 2009/0048750 A1 | 2/2009 | Breed |
| 2009/0055095 A1 | 2/2009 | Urban et al. |
| 2009/0067675 A1 | 3/2009 | Tan et al. |
| 2009/0102630 A1 | 4/2009 | Nordlund |
| 2009/0164080 A1 | 6/2009 | Kurata et al. |
| 2009/0299573 A1 | 12/2009 | Thrun et al. |
| 2009/0306881 A1 | 12/2009 | Dolgov et al. |
| 2010/0034422 A1 | 2/2010 | James et al. |
| 2010/0079590 A1 | 4/2010 | Kuehnle et al. |
| 2010/0082195 A1 | 4/2010 | Lee et al. |
| 2010/0104199 A1 | 4/2010 | Zhang et al. |
| 2010/0106356 A1 | 4/2010 | Trepagnier et al. |
| 2010/0114416 A1 | 5/2010 | Au et al. |
| 2010/0145552 A1 | 6/2010 | Herman et al. |
| 2010/0148948 A1 | 6/2010 | Murphy et al. |
| 2010/0168965 A1 | 7/2010 | Doerr et al. |
| 2010/0228420 A1 | 9/2010 | Lee |
| 2010/0246889 A1 | 9/2010 | Nara et al. |
| 2010/0256836 A1 | 10/2010 | Mudalige |
| 2010/0274430 A1 | 10/2010 | Dolgov et al. |
| 2010/0295668 A1 | 11/2010 | Kataoka |
| 2010/0332050 A1 | 12/2010 | Kobayashi |
| 2011/0060524 A1 | 3/2011 | Miyajima et al. |
| 2011/0169958 A1 | 7/2011 | Imai et al. |
| 2011/0184605 A1 | 7/2011 | Neff |
| 2011/0200258 A1* | 8/2011 | Suzuki et al. .................. 382/199 |
| 2011/0301813 A1 | 12/2011 | Sun et al. |
| 2012/0022739 A1 | 1/2012 | Zeng |
| 2012/0050074 A1* | 3/2012 | Bechtel et al. ................ 340/988 |
| 2012/0057757 A1* | 3/2012 | Oyama ......................... 382/104 |
| 2012/0062747 A1 | 3/2012 | Zeng |
| 2012/0081234 A1 | 4/2012 | Shaffer et al. |
| 2012/0083960 A1 | 4/2012 | Zhu et al. |
| 2012/0150437 A1 | 6/2012 | Zeng et al. |
| 2012/0264376 A1 | 10/2012 | Breed |
| 2012/0283895 A1 | 11/2012 | Noda |
| 2012/0314070 A1 | 12/2012 | Zhang et al. |
| 2012/0323473 A1 | 12/2012 | Irie et al. |
| 2013/0006478 A1 | 1/2013 | Lin |
| 2013/0079990 A1 | 3/2013 | Fritsch et al. |

OTHER PUBLICATIONS

Joel C. McCall and Mohan M. Trivedi, "Video-Based lane Estimation and Tracking for Driver Assistance: Survey, System, and Evaluation," IEEE Transactionas on Intelligent Transportation Systems, Vol. 7, No. 1, Mar. 2006.

* cited by examiner

COMPUTER PROGRAM PRODUCT 500

SIGNAL BEARING MEDIUM 501

PROGRAM INSTRUCTIONS 502

- RECEIVING, FROM AN IMAGE-CAPTURE DEVICE COUPLED TO A VEHICLE, AN IMAGE OF A ROAD OF TRAVEL OF THE VEHICLE

- IDENTIFYING A PIXEL IN THE IMAGE BASED ON AN INTENSITY OF THE PIXEL AND A COMPARISON OF THE INTENSITY OF THE PIXEL TO RESPECTIVE INTENSITIES OF NEIGHBORING PIXELS

- DETERMINING, BASED ON THE INTENSITY AND THE COMPARISON, A LIKELIHOOD THAT THE PIXEL BELONGS TO A PORTION OF THE IMAGE DEPICTING A LANE MARKER ON THE ROAD

- PROVIDING INSTRUCTIONS TO CONTROL, USING A COMPUTING DEVICE, THE VEHICLE BASED AT LEAST ON THE LIKELIHOOD

| COMPUTER READABLE MEDIUM 503 | COMPUTER RECORDABLE MEDIUM 504 | COMMUNICATIONS MEDIUM 505 |

FIGURE 5

LANE BOUNDARY DETECTION USING IMAGES

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure discloses embodiments that relate to lane boundary detection using images. In one aspect, the present disclosure describes a method. The method may comprise receiving, from an image-capture device coupled to a vehicle, an image of a road of travel of the vehicle. The method also may comprise identifying a pixel in the image based on an intensity of the pixel and a comparison of the intensity of the pixel to respective intensities of neighboring pixels. The method further may comprise determining, based on the intensity and the comparison, a likelihood that the pixel belongs to a portion of the image depicting a lane marker on the road. The method also may comprise providing instructions to control, using a computing device, the vehicle based at least on the likelihood.

In another aspect, the present disclosure describes a non-transitory computer readable medium having stored thereon executable instructions that, upon execution by a computing device, cause the computing device to perform functions. The functions may comprise receiving, from an image-capture device coupled to a vehicle, an image of a road of travel of the vehicle. The functions also may comprise identifying a pixel in the image based on an intensity of the pixel and a comparison of the intensity of the pixel to respective intensities of neighboring pixels. The functions further may comprise determining, based on the intensity and the comparison, a likelihood that the pixel belongs to a portion of the image depicting a lane marker on the road. The functions also may comprise providing instructions to control the vehicle based at least on the likelihood.

In still another aspect, the present disclosure describes a control system. The control system may comprise at least one processor. The control system also may comprise a memory having stored thereon executable instructions that, upon execution by the at least one processor, cause the control system to perform functions comprising receiving, from an image-capture device coupled to a vehicle, an image of a road of travel of the vehicle. The functions may also comprise identifying a pixel in the image based on an intensity of the pixel and a comparison of the intensity of the pixel to respective intensities of neighboring pixels. The functions further may comprise determining, based on the intensity and the comparison, a likelihood that the pixel belongs to a portion of the image depicting a lane marker on the road. The functions may also comprise providing instructions to control the vehicle based at least on the likelihood.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a schematic illustrating a conceptual partial view of a computer program, in accordance with an example embodiment.

DETAILED DESCRIPTION

Figure 1:
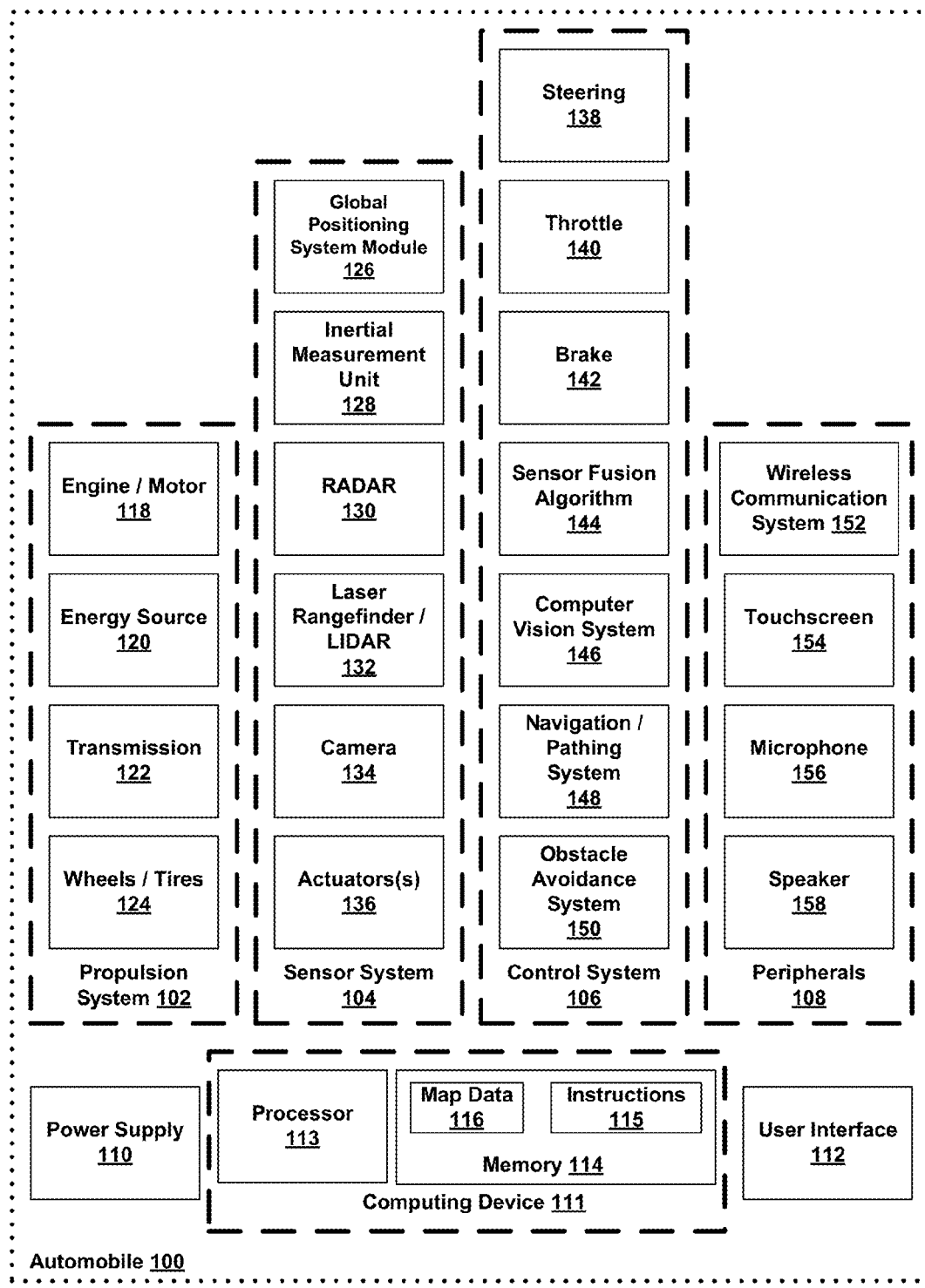
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on identifying lane boundaries for navigation. A computing device, configured to control the vehicle, may be configured to have access to map information that may indicate the lane boundaries on the road. However, in some examples, the map information may include inaccuracies in estimation of the lane boundaries or may not be updated with road changes (e.g., construction zones, etc.).

In an example, to facilitate identification of the lane boundaries, the computing device may be configured to receive, from an image-capture device coupled to the vehicle, an image of the road, and identify the lane boundaries in the image. A pixel in the image may belong to a lane marker that may be represented by several pixels, for example. Close neighboring pixels to the pixel may have substantially similar intensities (e.g., level of brightness) to an intensity of the pixel, since the close neighboring pixels may also belong to the lane marker. However, intensities of pixels beyond boundaries or edges of the lane marker may belong to non-marked portion of the road (e.g., asphalt) and may have lower intensities compared to the intensity of the pixel, for example. Thus, to identify lane markers in the image, the computing device may be configured to determine, for each pixel in the image, a respective intensity of that pixel; compare the respective intensity to given intensities of respective neighboring pixels surrounding that pixels; and determine, based on the respective intensity and the comparing, whether that pixel is a candidate lane marker pixel or not.

Further, the computing device may be configured to determine, for a candidate pixel, a likelihood that the candidate pixel belongs to a lane marker. The likelihood that a given pixel (or pixels) belongs to the lane marker may be indicative of a level of confidence in estimation of the lane boundaries. Further, the computing device may be configured to provide instructions to control the vehicle based on the estimated lane boundaries and the likelihood.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
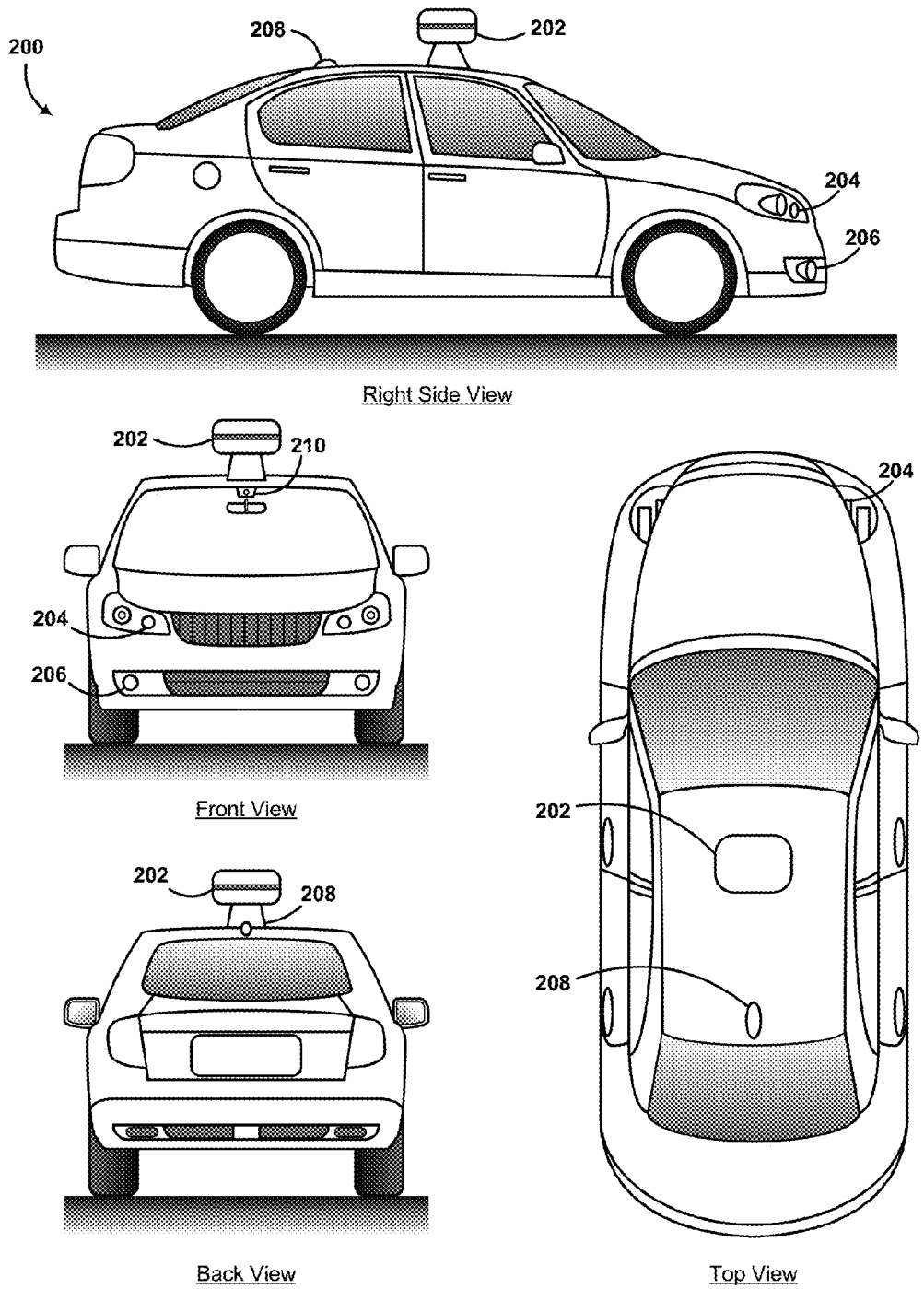
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
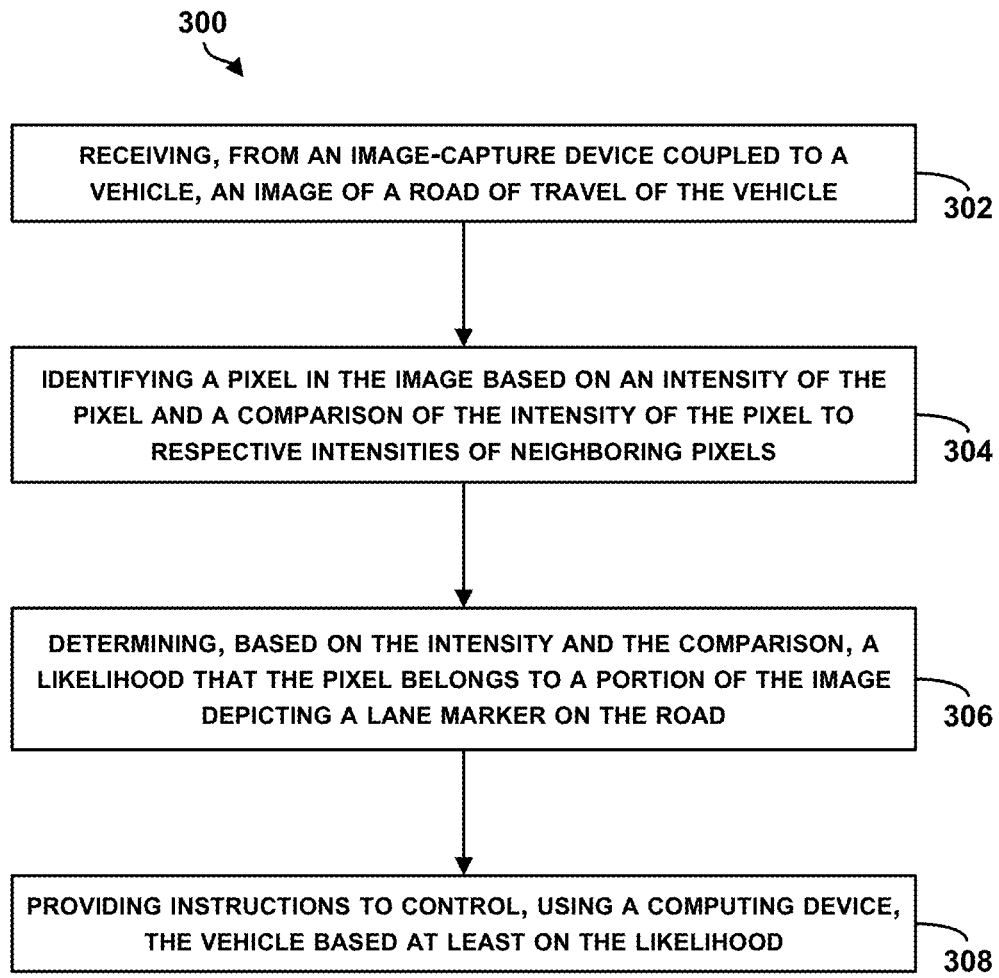
FIG. 3 is a flow chart of a method for lane boundary detection using images, in accordance with an example embodiment.

FIG. 3 is a flow chart of a method 300 for lane boundary detection using images, in accordance with an example embodiment. The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. In addition, for the method 300 and other processes and methods disclosed herein, each block in FIG. 3 may represent circuitry that is wired to perform the specific logical functions in the process.

At block 302, the method 300 includes receiving, from an image-capture device coupled to a vehicle, an image of a road of travel of the vehicle. A controller or a computing device, such as the computing device 111 in FIG. 1, may be onboard the vehicle or may be off-board but in wireless communication with the vehicle, for example. Also, the computing device may be configured to control the vehicle in an autonomous or semi-autonomous operation mode. Further, the computing device may be configured to receive, from sensors and devices coupled to the vehicle, information associated with, for example, condition of systems and subsystems of the vehicle, driving conditions, road conditions, etc.

A camera, such as the camera 134 in FIG. 1 or the camera 210 in FIG. 2 or any other image-capture device, may be coupled to the vehicle and may be in communication with the computing device. The camera may be configured to capture images or a video of the road and vicinity of the road. The computing device may be configured to receive the images or video and identify, using image processing techniques for example, objects depicted in the image or the video. The computing device may be configured to compare portions of the images to templates of objects to identify the objects, for example. Examples of objects may include moving or static objects, traffic signs, obstacles on the road, pedestrians, lane markers, etc. Herein, "lane markers" may include painted solid or dashed white or yellow lines, raised pavement markers referred to as Botts' dots, retroreflective safety devices used in road marking and referred to as Cat's Eyes, or any other type of lane markers that define lane boundaries on the road.

Botts' dots are round non-reflective raised pavement markers. Botts' dots may be used to mark lanes on highways and arterial roads, and provide tactile feedback to drivers when moving across designated travel lanes, and may be considered analogous to rumble strips. Botts' dots may be white, but, in some examples, may be yellow when used to substitute for the yellow lines that divide opposing directions of traffic in North America. The dots can be made of various ceramic materials or plastics like polyester. On some roads, lanes may be marked with a mix of Botts' dots and conventional reflective markers.

Cat's Eyes may include two pairs of reflective glass spheres set into a white rubber dome, and mounted in a cast iron housing, for example. This type of Cat's Eyes can be used to mark a center of the road, with one pair of Cat's Eyes showing in each direction. Another type of Cat's Eyes may include a single-ended form used in other colors at road margins and as lane dividers. Cat's Eyes may be characterized by a flexible rubber dome, which may occasionally be deformed by passage of traffic. The rubber dome may be protected from impact damage by metal 'kerbs,' which may also give tactile and audible feedback for drivers who cross a lane boundary.

In another example, in addition to or alternative to receiving images captured by a camera, the computing device may be configured to receive, from a LIDAR device (e.g., the LIDAR unit 132 in FIG. 1) coupled to the vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the vehicle in three dimensions. In some examples, more than one LIDAR device may be coupled to the vehicle to scan a complete 360° horizon of the vehicle. The LIDAR device may be configured to provide to the computing device a cloud of point data representing objects (e.g., lane markers), which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the vehicle. Additionally, the LIDAR device may be configured to provide to the computing device intensity values of the light or laser reflected off a given object that may be indicative of a surface type of the given object. Based on such information, the computing device may be configured to identify the objects such as lane markers. LIDAR device points representing lane markers, for example, may be characterized by high intensity values relative to neighboring points that represent non-marked portions of the road.

In one example, the computing device may be configured to detect and identify the objects based on information received from multiple sources such as the camera, the LIDAR device, etc. However, in another example, the computing device may be configured to identify the objects based on information received from a subset of the multiple sources. For example, images captured by the camera may be blurred due to a malfunction of the camera, and in another example, details of the road may be obscured in the images because of fog. In these examples, the computing device may be configured to identify the objects based on information received from the LIDAR device and may be configured to disregard the information received from the camera.

In another example, the vehicle may be travelling in a portion of the road where some electric noise or jamming signals may cause the LIDAR device to operate incorrectly. In this case, the computing device may be configured to identify the objects based on information received from the camera, and may be configured to disregard the information received from the LIDAR device.

In one example, the computing device may be configured to rank these sources of information based on a condition of the road (e.g., fog, electronic jamming, etc.). The ranking may be indicative of which device(s) to rely on or give more weight to in identifying the objects. As an example, if fog is present in a portion of the road, then the LIDAR device may be ranked higher than the camera, and information received from the LIDAR device may be given more weight than respective information received from the camera.

Figure 4A:
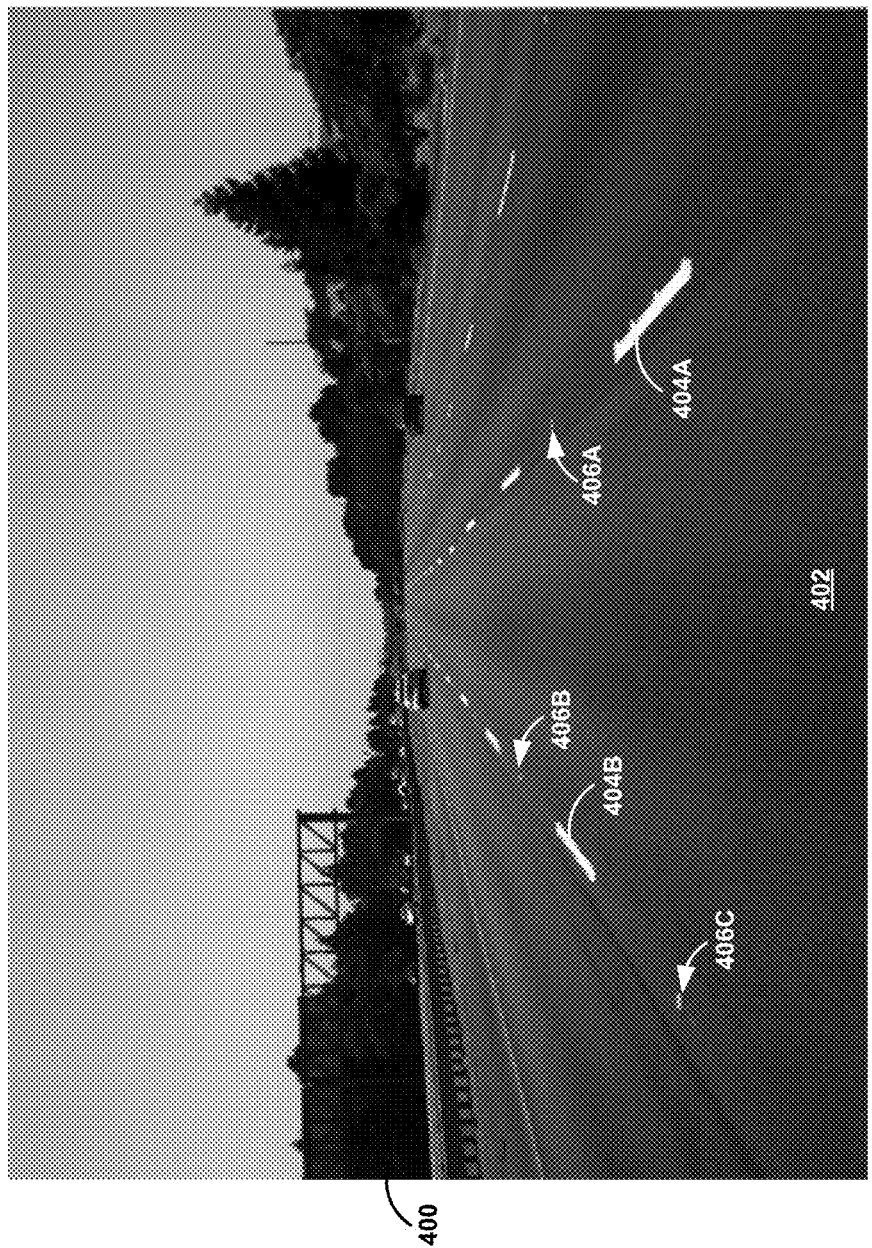
FIG. 4A illustrates an image of a road of travel of a vehicle, in accordance with an example embodiment.

FIG. 4A illustrates an image 400 of a road 402 of travel of a vehicle, in accordance with an example embodiment. The image 400 may be captured from a camera coupled to the vehicle travelling on the road 402, for example. The image 400 depicts the road 402, white lines such as 404A and 404B representing lane boundaries, and Cat's Eyes or Botts' dots 406A, 406B, and 406C.

Figure 4B:
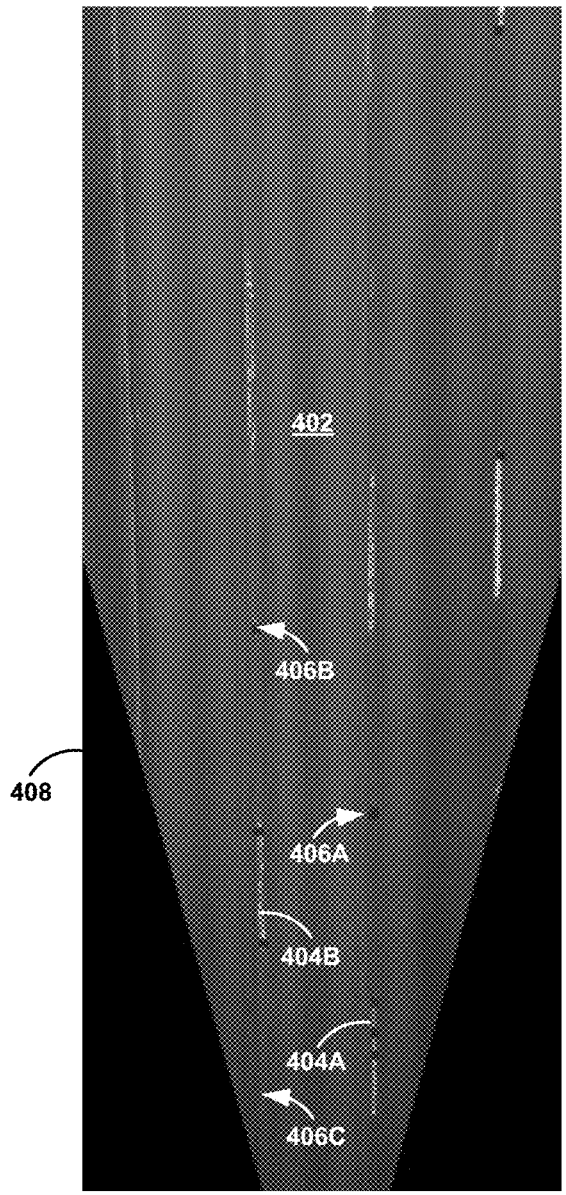
FIG. 4B illustrates a top view image corresponding to the image of the road, in accordance with an example embodiment.

In one example, in order to facilitate detection or identification of lane boundaries in the image, the computing device, configured to control the vehicle, may be configured to generate a top view image corresponding to the image in FIG. 4A. FIG. 4B illustrates a top view image 408 corresponding to the image 400 of the road, in accordance with an example embodiment. By generating the tope view image 408, perspective effect in the image 400 can be removed, and thus lanes that appear to converge at the horizon line may become substantially parallel. In this manner, identification of lane boundaries may be facilitated and accuracy may be improved.

Several methods can be used to transform the 400 image into the top view image 408 depicted in FIG. 4B. The image 408 may be generated by transforming the image 400 such that a planar object such as the road 402 can be observed from a direction perpendicular to a surface of the road 400.

In examples, to generate top view images, a calibration procedure may be performed for the camera. To calibrate the camera, an image may be captured and a corresponding top view image may also be captured. Sets of pixels may be identified in the image and corresponding sets of points may be identified in the top view image. The calibration procedure may also include obtaining camera parameters such as focal length, pixel size, mounting location and angle, etc. The camera parameters may be used to generate a homography matrix (e.g., a 3×3 planar projective transformation matrix) that can be applied to the sets of pixels to generate the corresponding sets of pixels, for example. The homography matrix may be stored in the computing device configured to control the vehicle.

The computing device may be configured to apply the matrix to images captured by the camera such as the image 400 to generate corresponding top view images such as the top view image 408. In some examples, the computing device may be configured to modify the matrix to adapt to changes in conditions or changes to camera parameters, etc.

Referring back to FIG. 3, at block 304, the method 300 includes identifying a pixel in the image based on an intensity of the pixel and a comparison of the intensity of the pixel to respective intensities of neighboring pixels. The computing device may be configured to identify the pixel in the image received or in a corresponding top view image.

For example, a lane marker may include short contiguous bright regions residing on dark regions of the road that are not marked. Thus, a given lane marker can be modeled as a rising edge (increase in intensity or brightness of pixels) followed by a short flat bright region and a falling edge. Template-matching or filtering based methods can be used to treat two edges and the flat region between them as features that are independently contributing to identifying lane markers. However, other marks on the roads from trees or other objects, for example, may exhibit similar characteristics that, if such approach is used, may yield to false identification of lane markers.

To avoid such false identification of lane markers, the computing device may be configured to take into account presence of these features together, as opposed to independently, to identify pixels representing lane markers. To identify lane markers, the computing device may be configured to scan the image (e.g., the image 400 or the top view image 408) to identify pixels that may belong to portions of the image depicting lane markers such as painted lines, Cat's Eyes and Botts' dots. A lane marker may be represented by a single pixel or a group of pixels. Pixels depicting lane markers may exhibit several characteristics or features that may collectively be used by the computing device to identify such pixels. The features may include, for example, intensity (e.g., level of brightness) of a pixel in the image. The features may also include a measure of relative intensity of the pixel with respect to close neighboring pixels in both lateral and longitudinal directions. Further, the features may include a respective measure of relative intensity of the pixel with respect to distant neighboring pixels in both lateral and longitudinal direction. The lateral direction may be perpendicular to a direction of heading of the vehicle on the road, and the longitudinal direction may be parallel to the direction of heading of the vehicle on the road. Close neighboring pixels may include pixels that are within a threshold number of rows or columns of pixels relative to a location of the pixel in the image, for example. Distant neighboring pixels may include respective pixels that are beyond a respective threshold number of rows or columns of pixels relative to the location of the pixel in the image, for example.

For instance, assuming that the lane marker is a white line painted on the road, pixels composing the lane marker width may be bright (e.g., having intensity above a threshold intensity), but pixels laterally beyond a boundary of the white line (e.g., to the left and right of the white line) may belong to unpainted portions of the road and thus have a lower brightness. Thus, for a pixel of the pixels representing the white line, the intensity of the pixel may be high (e.g., above a threshold intensity). Also, close neighboring pixels, in both lateral and longitudinal directions, may be part of the white line and may also have respective intensities similar to intensity of the pixel. However, distant neighboring pixels, in a lateral direction, may represent dark unpainted parts of the road that may have lower intensities compared to the intensity of the pixel. In examples, distant neighboring pixels in a longitudinal direction may have high intensities if the white line is a solid continuous line, or the distant neighboring pixels belong to the same white dash that the pixel belongs to, or a neighboring dash. Presence of these features together may indicate or increase the probability that a given pixel belongs to a portion of the image depicting a given lane marker, while absence of one or more of these features may indicate a false identification.

In some examples, a lane marker may be depicted by a single pixel (e.g., in low resolution images). In other examples, a lane marker may be depicted by a group of pixels (e.g., in higher resolution images). In these examples, in addition or alternative to identifying individual pixels, the computing device may be configured to identify a group of pixels based on intensities of pixels of the group of pixels and comparison of the intensities to given intensities of given pixels of neighboring groups of pixels in the image. The group of pixels may belong to a portion of the image that depicts a lane marker, for example.

In the image 400 of FIG. 4A, or the corresponding top view image 408 in FIG. 4B, the computing device may be configured to identify pixels representing lane markers such as the white lines 404A and 404B, or the Botts' dots (or Cat's Eyes) 406A, 406B, and 406C. The white lines 404A and 404B may, for example, be represented by a group of pixels. For instance, the computing device, upon scanning or analyzing pixels of the image 400 or 408, may be configured to determine an intensity of a pixel of the pixels depicting the white lines 404A. The computing device also may be configured to compare the intensity of the pixel to respective intensities of close and distant pixels. For example, assuming that the pixel is at the middle of the white line 404A, pixels longitudinally neighboring to the pixel (e.g., rows of pixels within a threshold number of rows above and below the pixel) may have similar intensities. Close neighboring pixels in a lateral direction may also have similar intensities; however, relatively distant neighboring pixels in the lateral direction (e.g., columns of pixels beyond a respective threshold number of columns) may belong to the unpainted road and may thus have low intensities compared to the intensity of the pixel. In this manner, the computing device may be configured to determine that the pixel is a candidate pixel that may belong to a portion of the image depicting a lane marker (i.e., the white line 404A in this example). In a similar manner, the computing device may be configured to identify candidate pixels that may belong to other portions of the image depicting other lane markers, such as the white line 404B, and the Botts' dots (or Cat's Eyes) 406A, 406B, and 406C.

Figure 4C:
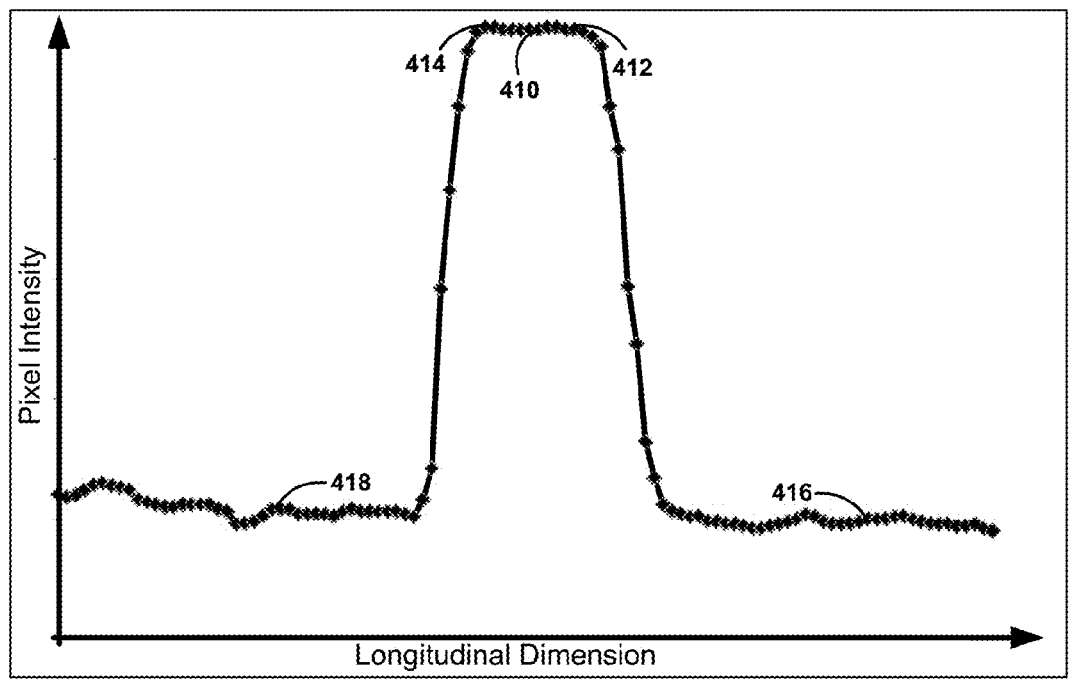
FIG. 4C illustrates pixel intensities of a lateral cross section of a lane marker and a neighborhood of the lane marker depicted in an image, in accordance with an example embodiment.

FIG. 4C illustrates pixel intensities of a lateral cross section of a lane marker and a neighborhood of the lane marker depicted in an image, in accordance with an example embodiment. Graph markers (i.e., diamond shape markers) in FIG. 4C, such as graph markers 410, 412, 414, 416, and 418, correspond to pixels of a lateral cross section of a lane marker such as the white line 404B in the image 400, for example. In FIG. 4C, intensity of a pixel represented by the graph marker 410 is relatively high. Close neighboring pixels such as the pixels represented by the graph markers 412 and 414, which may belong to columns of pixels to the right and left of the column of pixels including the pixel represented by the graph marker 410, also have similar intensities. However, distant pixels represented by the graph markers 416 and 418 have lower intensities and may thus belong to unpainted portions of the road. The computing device may be configured to determine the intensity of the pixel represented by the graph marker 410, and compare the intensity of the pixel to intensities of close neighboring pixels (e.g., pixels represented by the graph markers 412 and 414) and distant neighboring (e.g., pixels represented by the graph markers 416 and 418). Accordingly, the computing device may be configured to determine that the pixels represented by the graph markers 410, 412, and 414 may belong to a portion of the image (e.g., the image 400) that depicts a lane marker (the white line 404B), for example.

Figure 4D:
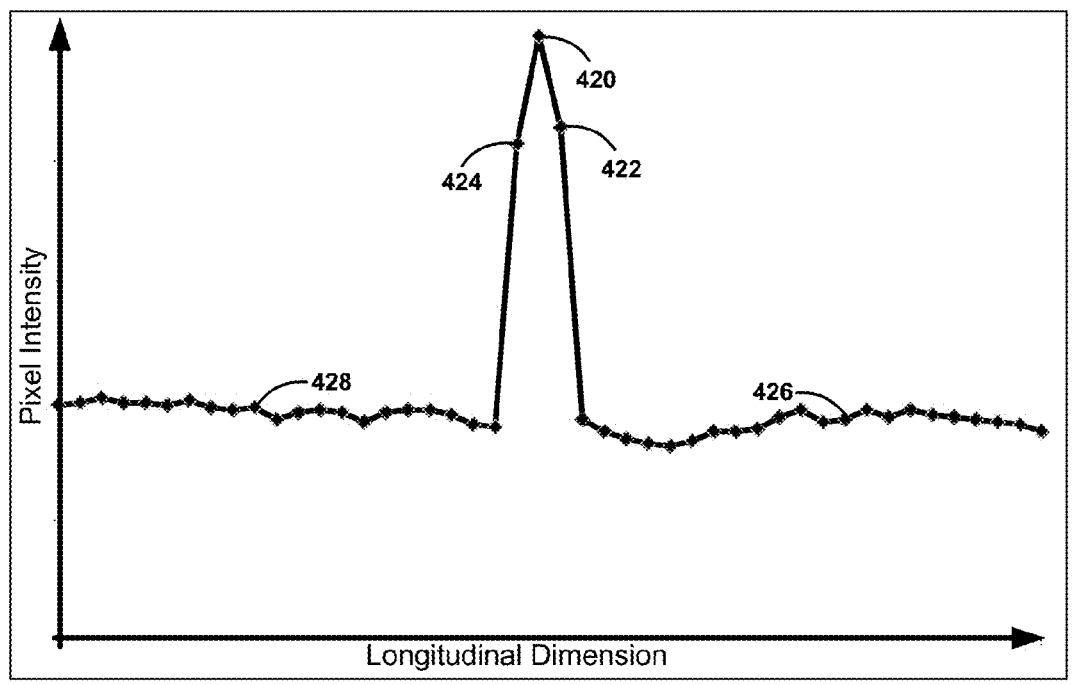
FIG. 4D illustrates pixel intensities of a lateral cross section of a lane marker and a neighborhood of the lane marker depicted in a top view image, in accordance with an example embodiment.

FIG. 4D illustrates pixel intensities of a lateral cross section of a lane marker and a neighborhood of the lane marker depicted in a top view image, in accordance with an example embodiment. For example, FIG. 4D may illustrate pixel intensities corresponding to pixels of the white line 404B in the top view image 408. Similar to the description of FIG. 4C, the computing device may be configured to determine the intensity of a pixel represented by a graph marker 420, and compare the intensity of the pixel to intensities of close neighboring pixels (e.g., pixels represented by graph markers 422 and 424) and distant neighboring (e.g., pixels represented by graph markers 426 and 428). Accordingly, the computing device may be configured to determine that the pixels represented by the graph markers 420, 422, and 424 may belong to a portion of the image (e.g., the image 408) that depicts a lane marker (the white line 404B), for example.

Referring back to FIG. 3, at block 306, the method 300 includes determining, based on the intensity and the comparison, a likelihood that the pixel belongs to a portion of the image depicting a lane marker on the road. The computing device may be configured to combine the features, such as an intensity of a pixel and comparison of the intensity of the pixel to intensities of close and distant neighboring pixels, probabilistically to determine a likelihood that the pixel belongs to a portion of the image depicting a lane marker.

When a probabilistic approach that takes into account simultaneous occurrences of all or majority of features typically exhibited by pixels representing a lane marker is used, false identification resulting from presence of individual features or a small group of features may be avoided. As examples, pixels representing thin bright lines, bright regions that have different intensities on both sides, and bright regions with non-uniform brightness, may represent objects on the road that exhibit features similar to pixels representing lane markers. In these examples, a template matching or linear filtering method that is based on individual features may estimate a high probability that such pixels represent a lane marker. However, a probabilistic approach that is based on simultaneous occurrence of all or majority of the features may result in a low probability that such pixels represent a lane marker.

In an example, the computing device may be configured to assign a respective likelihood to each feature (e.g., intensity of the pixel or relative intensity of the pixel with respect to respective intensities of close and distant neighboring pixels) of the features based on a comparison of that feature to a corresponding feature of a typical lane marker. As an example, the computing device may be configured to determine a match metric indicative of how similar the intensity of the pixel is to the corresponding intensity of the lane marker (e.g., a percentage of match between that feature and the corresponding feature the typical lane marker). The computing device may be configured to determine the respective likelihood based on the match metric. Further the computing device may be configured to determine a single likelihood, based on a combination of the respective likelihoods, indicative of a level of confidence that the pixel belongs to a portion of the image depicting the lane marker.

As an example for illustration, the computing device may be configured to detect a pixel with an intensity similar to a given intensity of a typical lane marker. However, a comparison of the intensity of the pixel to respective intensities of close neighboring pixels and to respective intensities of distant neighboring pixels may indicate that the pixel does not exhibit the features of a given pixel representing a typical lane marker. In this example, a first likelihood relating to the intensity of the pixel may be high, but a second likelihood relating to the comparison of the intensity of the pixel to respective intensities of neighboring pixels may be low. The overall likelihood that this pixel belongs to a portion of the image depicting a lane marker may thus be low (e.g., less than a threshold likelihood). In another example, the overall likelihood may include a consolidated posterior likelihood that is a result of a multiplication of the first likelihood and the second likelihood.

In another example, the computing device may be configured to generate a probabilistic model (e.g., a Gaussian distribution), based on the features of a pixel in the image, to determine the likelihood that the pixel belongs to a portion of the image that depicts a lane marker. For example, the likelihood that the pixel belongs to a portion of the image that depicts a lane marker may be determined as a function of a set of parameter values that are determined based on the features of the pixel (intensity of the pixel and relative intensity of the pixel with respect to respective intensities of close and distant neighboring pixels). In this example, the likelihood may be defined as equal to probability of an observed outcome (the pixel belongs to a portion of the image depicting a lane marker) given those parameter values. Those skilled in the art will appreciate that determining the likelihood function may involve distinguishing between discrete probability distribution, continuous probability distribution, and mixed continuous-discrete distributions, and that several types of likelihood exist such as log likelihood, relative likelihood, conditional likelihood, marginal likelihood, profile likelihood, and partial likelihood.

In still another example, the computing device may be configured to process the features of the pixel through a classifier to determine the likelihood. The classifier can be defined as an algorithm or mathematical function implemented by a classification algorithm that maps input information (e.g., the features of the pixel) to a class (e.g., the pixel belongs to a portion of the image depicting a lane marker).

Classification may involve identifying to which of a set of classes (e.g., the pixel belongs to a portion of the image depicting a lane marker or belongs to a portion of the image depicting a bright object that is not a lane marker) a new observation may belong, on the basis of a training set of data containing observations (or instances) with a known class. The individual observations may be analyzed into a set of quantifiable properties, known as various explanatory variables or features. As an example, classification may include assigning a respective likelihood to "pixel belongs to a portion of the image depicting a lane marker" or "pixel does not belong to a portion of the image depicting a lane marker" classes as indicated by respective determined features of a respective pixel (e.g., intensity of the respective pixel and relative intensity of the respective pixel with respect to respective intensities of close and distant neighboring pixels).

Example classification algorithms may include Linear classifiers (e.g., Fisher's linear discriminant, logistic regression, naive Bayes, and perceptron), Support vector machines (e.g., least squares support vector machines), quadratic classifiers, kernel estimation (e.g., k-nearest neighbor), boosting, decision trees (e.g., random forests), neural networks, Gene Expression Programming, Bayesian networks, hidden Markov models, and learning vector quantization. Other example classifiers are also possible.

As an example for illustration, a linear classifier may be expressed as a linear function that assigns a score or likelihood to each possible class k (e.g., "pixel belongs to a portion of the image depicting a lane marker" or "pixel does not belong to a portion of the image depicting a lane marker") by combining a feature vector (vector of parameters associated with the features of the pixel) of an instance (e.g., a driving situation in which an image including the pixel is captured) with a vector of weights, using a dot product. Class with the higher score or likelihood may be selected as a predicted class. This type of score function is known as a linear predictor function and may have this general form:

$$\text{Score}(X_i, k) = \beta_k \cdot X_i \quad \text{Equation (1)}$$

where $X_i$ is the feature vector for instance i, $\beta_k$ is a vector of weights corresponding to category k, and score $(X_i, k)$ is the score associated with assigning instance i to category k.

As an example, a training computing device may be configured to receive training data for a plurality of driving situations of a given vehicle. For example, for each of the plurality of driving situations, respective training data may include images and respective features of pixels in the images. Also, the training computing device may be configured to receive positive or negative indication that a given pixel belongs to a portion of the image depicting a lane marker corresponding to the respective training data for each of the driving situations. Further the training computing device may be configured to correlate, for each driving situation, the positive or negative indication with the respective training data. Based on the correlations for the plurality of driving situations, the training computing device may be configured to determine parameters (e.g., vector of weights for equation 1) of the classifier.

These parameters may be provided to the computing device configured to control the vehicle. As the computing device determines features of a pixel in an image, the computing device may be configured to process the features through the classifier using the determined parameters of the classifier. In this manner, the computing device may be configured to determine the likelihood that the pixel belongs to a portion of the image depicting a given lane marker.

In one example, the likelihood may be qualitative such as "low," "medium," or "high" or may be numerical such as a number on a scale, for example. Other examples are possible.

In examples, where the computing device may be configured to determine a group of pixel based on intensities of pixels of the group of pixels and comparison of the intensities to given intensities of given pixels of neighboring groups of pixels in the image, the computing device may be configured to determine a given likelihood that the group of pixels belongs to a portion of the image depicting a lane marker. For example, the group of pixels may represent an edge of a lane marker. Based on identifying such groups of pixels, the computing device may be configured to estimate a location of a lane boundary on the road.

In some examples, the computing device may be configured to take into account a driving context or context indicated by the image in determining the likelihood. For instance, a Global Position System (GPS) module may be coupled to the vehicle and may be configured to provide, to the computing device, location information relating to a current geographic location (i.e., with respect to the Earth, using satellite-based positioning data) of the vehicle on the road. If the location information indicates that the vehicle is on a road, as opposed to a parking lot or a garage for example, then there may be a higher likelihood that the identified pixels represent lane markers on the road.

In another example, in addition to or alternative to the location information, if images captured by a forward looking and/or a backward looking image-capture device indicate that other vehicles are following or are in front of the vehicle, then there is a high likelihood that the vehicle is being driven on a road. Thus, there may be a higher likelihood that the identified pixels represent lane markers on a road as opposed to a parking lot or a garage.

In still another example, the computing device may be configured to take into account characteristics of the vehicle such as whether the engine is running, whether the car is moving, whether there is a person in a driver's seat, etc., to determine whether the vehicle is being driven on a road or not. The computing device may be configured to take such information into consideration when determining the likelihood that the identified pixels represent lane markers.

In addition to or alternative to taking context information into consideration when determining the likelihood, the computing device may be configured to initiate the method 300 for lane boundary detection based on the context information. For instance, if the location information, images, and/or vehicle characteristics indicate that the vehicle is likely being driven on a road, the computing device may be configured to initiate the method 300 to detect lane boundaries.

With respect to FIG. 4A, or the corresponding top view image 4B, the computing device may be configured to determine a likelihood that the candidate pixels identified, as described at block 304, belong to portions of the image depicting lane markers. In an example, if the likelihood that a group of pixels (e.g., pixels of the white line 404A) represent a lane marker is high (greater than a threshold likelihood), the computing device may be configured to designate the group of pixels as lane markers.

Figure 4E:
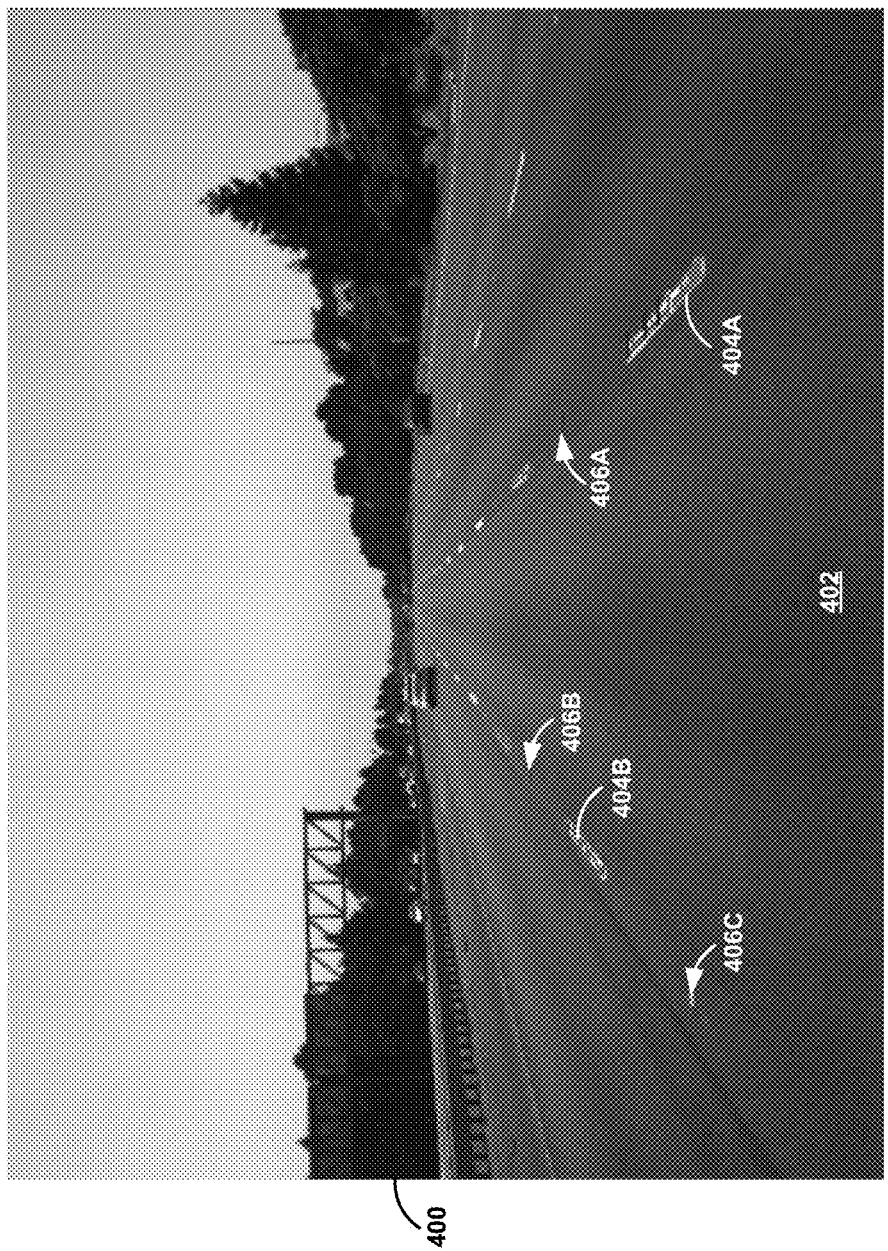
FIG. 4E illustrates the image with identified lane markers, in accordance with an example embodiment.

FIG. 4E illustrates the image 400 with identified lane markers, in accordance with an example embodiment. The pixels identified and designated as lane markers (e.g., representing the white lines 404A and 404B, and Botts' dots 406A and 406B) are shaded and superimposed on the image 400 to generate FIG. 4E.

Referring back to FIG. 3, at block 308, the method 300 includes providing, using the computing device, instructions to control the vehicle based at least on the likelihood. The control system of the vehicle may support multiple control strategies and associated driving behaviors that may be predetermined or adaptive to changes in a driving environment of the vehicle. Generally, a control strategy may comprise sets of rules associated with traffic interaction in various driving contexts. The control strategy may comprise rules that determine a speed of the vehicle and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, based on the determined likelihood that a group of pixels belong to a portion of an image depicting a lane marker, the computing device may be configured to estimate a lane boundary. Based on the estimated lane boundary, the computing device may be configured to select a control strategy comprising rules for actions that control the vehicle such that the vehicle adheres to the estimated lane boundary.

In an example, a given control strategy may comprise a program or computer instructions that characterize actuators controlling the vehicle (e.g., throttle, steering gear, brake, accelerator, or transmission shifter) based on the likelihood and the estimated lane boundary. The given control strategy may include action sets ranked by priority, and the action sets may include alternative actions that the vehicle may be configured to take to accomplish a task (e.g., driving from one location to another). The alternative actions may be ranked based on the likelihood and the estimated lane boundary, for example.

In another example, multiple control strategies (e.g., programs) may continuously propose actions to the computing device. The computing device may be configured to decide which strategy may be selected based on a weighted set of goals (e.g., safety, speed, adhering to the estimated lane boundary, etc.), for example. Based on an evaluation of the weighted set of goals, the computing device, for example, may be configured to rank the multiple control strategies and respective action sets and determine a given control strategy and a respective action set based on the ranking.

As an example, providing instructions to control the vehicle may comprise determining a desired path of the vehicle, based on the likelihood. In one example, the computing device may determine a high likelihood (e.g., greater than a threshold likelihood) that given pixels represent a lane marker and may thus estimate the lane boundary with a high level of confidence. In this example, the computing device may be configured to take into account the lane boundary indicated by the lane markers on the road as a hard constraint (i.e., the lane boundary cannot be violated) when determining the desired path. Alternatively, in another example, the computing device may determine a low likelihood (e.g., less than a threshold likelihood) that given pixels represent a lane marker and may thus assign a low level of confidence to the estimated lane boundary. In this example, the computing device may be configured to take into account lane boundary indicated by the lane markers on the road as a soft constraint (e.g., the lane boundary can be violated if a safer path is determined) when determining the desired path.

Thus, the computing device may be configured to provide instructions (e.g., instructions that may comprise an action set or rule set) that may be executed to control actuators of the vehicle. For instance, the computing device may be configured to provide program instructions to adjust translational velocity, or rotational velocity, or both, of the vehicle such that the vehicle may adhere to the estimated lane boundary. In FIG. 4A, for example, the computing device may be configured to provide instructions to control the vehicle such that the vehicle may adhere to the lane boundaries indicated by the identified lane markers, 404A, 404B, 406A, 406B, and 406C.

These control actions and driving situations are for illustration only. Other actions and situations are possible as well. In one example, the computing device may be configured to control the vehicle based on the modified control strategy as an interim control until a human driver can take control of the vehicle.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 3, one or more features of blocks 302-308 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, from an image-capture device coupled to a vehicle, an image of a road of travel of the vehicle;
   determining that a pixel in the image meets a first condition related to whether an intensity of the pixel exceeds a threshold intensity, wherein the threshold intensity is associated with a predetermined intensity of lane markers;
   determining that the pixel meets a second condition related to whether respective intensities of pixels within a threshold number of pixels from the pixel in a lateral direction are substantially equal to the intensity of the pixel, wherein the lateral direction is perpendicular to a direction of travel of the vehicle on the road;
   determining that the pixel meets a third condition related to whether respective intensities of pixels within a threshold number of pixels from the pixel in a longitudinal direction are substantially equal to the intensity of the pixel, wherein the longitudinal direction is parallel to the direction of travel of the vehicle on the road;

determining that the pixel meets a fourth condition related to whether respective intensities of pixels beyond a respective number of pixels from the pixel in the lateral and longitudinal directions are lower than the intensity of the pixel;

determining, based on the pixel meeting the first condition, the second condition, the third condition, and the fourth condition, a likelihood that the pixel belongs to a portion of the image depicting a lane marker on the road; and controlling, using a computing device, the vehicle based at least on the likelihood.

2. The method of claim 1, wherein determining the likelihood comprises:

determining a first likelihood based on the pixel meeting the first condition;

determining a second likelihood based on the pixel meeting the second condition;

determining a third likelihood based on the pixel meeting the third condition;

determining a fourth likelihood based on the pixel meeting the fourth condition;

determining the likelihood based on the first, second, third, and fourth likelihoods.

3. The method of claim 1, further comprising:

identifying a group of pixels based on intensities of pixels of the group of pixels and comparison of the intensities to given intensities of given pixels of neighboring groups of pixels in the image;

determining a given likelihood that the group of pixels form an edge of a lane marker; and estimating a location of a lane boundary on the road based on the given likelihood, wherein controlling the vehicle comprises is based on the estimated location of the lane boundary.

4. The method of claim 1, wherein the intensity of the pixel is indicative of a level of brightness of the pixel in the image.

5. The method of claim 1, wherein the computing device is configured to control the vehicle in an autonomous operation mode.

6. A non-transitory computer readable medium having stored thereon executable instructions that, upon execution a computing device, cause the computing device to perform functions comprising:

receiving, from an image-capture device coupled to a vehicle, an image of a road of travel of the vehicle;

determining that a pixel in the image meets a first condition related to whether an intensity of the pixel exceeds a threshold intensity, wherein the threshold intensity is associated with a predetermined intensity of lane markers;

determining that the pixel meets a second condition related to whether respective intensities of pixels within a threshold number of pixels from the pixel in a lateral direction are substantially equal to the intensity of the pixel, wherein the lateral direction is perpendicular to a direction of travel of the vehicle on the road;

determining that the pixel meets a third condition related to whether respective intensities of pixels within a threshold number of pixels from the pixel in a longitudinal direction are substantially equal to the intensity of the pixel, wherein the longitudinal direction is parallel to the direction of travel of the vehicle on the road;

determining that the pixel meets a fourth condition related to whether respective intensities of pixels beyond a respective number of pixels from the pixel in the lateral and longitudinal directions are lower than the intensity of the pixel;

determining, based on the pixel meeting the first condition, the second condition, the third condition, and the fourth condition, a likelihood that the pixel belongs to a portion of the image depicting a lane marker on the road; and controlling the vehicle based at least on the likelihood.

7. The non-transitory computer readable medium of claim 6, wherein the function of determining the likelihood comprises:

determining a first likelihood based on the pixel meeting the first condition;

determining a second likelihood based on the pixel meeting the second condition;

determining a third likelihood based on the pixel meeting the third condition;

determining a fourth likelihood based on the pixel meeting the fourth condition;

determining the likelihood based on the first, second, third, and fourth likelihoods.

8. The non-transitory computer readable medium of claim 6, wherein the intensity of the pixel is indicative of a level of brightness of the pixel in the image.

9. The non-transitory computer readable medium of claim 6, wherein the computing device is configured to control the vehicle in an autonomous operation mode.

10. A control system comprising:

at least one processor; and a memory having stored thereon executable instructions that, upon execution by the at least one processor, cause the control system to perform functions comprising:

receiving, from an image-capture device coupled to a vehicle, an image of a road of travel of the vehicle;

determining that a pixel in the image meets a first condition related to whether an intensity of the pixel exceeds a threshold intensity, wherein the threshold intensity is associated with a predetermined intensity of lane markers;

determining that the pixel meets a second condition related to whether respective intensities of pixels within a threshold number of pixels from the pixel in a lateral direction are substantially equal to the intensity of the pixel, wherein the lateral direction is perpendicular to a direction of travel of the vehicle on the road;

determining that the pixel meets a third condition related to whether respective intensities of pixels within a threshold number of pixels from the pixel in a longitudinal direction are substantially equal to the intensity of the pixel, wherein the longitudinal direction is parallel to the direction of travel of the vehicle on the road;

determining that the pixel meets a fourth condition related to whether respective intensities of pixels beyond a respective number of pixels from the pixel in the lateral and longitudinal directions are lower than the intensity of the pixel;

determining, based on the pixel meeting the first condition, the second condition, the third condition, and the fourth condition, a likelihood that the pixel belongs to a portion of the image depicting a lane marker on the road; and controlling the vehicle based at least on the likelihood.

11. The control system of claim 10, wherein function of determining the likelihood comprises:

determining a first likelihood based on the pixel meeting the first condition;
determining a second likelihood based on the pixel meeting the second condition;
determining a third likelihood based on the pixel meeting the third condition;
determining a fourth likelihood based on the pixel meeting the fourth condition;
determining the likelihood based on the first, second, third, and fourth likelihoods.

12. The control system of claim 10, wherein the functions further comprise:
identifying a group of pixels based on intensities of pixels of the group of pixels and comparison of the intensities to given intensities of given pixels of neighboring groups of pixels in the image;
determining a given likelihood that the group of pixels form an edge of a lane marker; and
estimating a location of a lane boundary on the road based on the given likelihood, wherein controlling the vehicle is based on the estimated location of the lane boundary.

13. The control system of claim 10, wherein the intensity of the pixel is indicative of a level of brightness of the pixel in the image.

14. The control system of claim 10, wherein the control system is configured to control the vehicle in an autonomous operation mode.

* * * * *